United States Patent
Xu et al.

(10) Patent No.: US 12,364,332 B2
(45) Date of Patent: Jul. 22, 2025

(54) BALL BEARING SLIDE

(71) Applicant: WUXI HAIDAER PRECISION SLIDES CO., LTD, Jiangsu (CN)

(72) Inventors: Xinglong Xu, Jiangsu (CN); Haiwen Zhang, Jiangsu (CN); Lian Zou, Jiangsu (CN); Feng Qian, Jiangsu (CN); Kai Dai, Jiangsu (CN); Qiang Ji, Jiangsu (CN)

(73) Assignee: WUXI HAIDAER PRECISION SLIDES CO., LTD, Jiangsu (CN)

( * ) Notice: Subject to any disclaimer, the term of this patent is extended or adjusted under 35 U.S.C. 154(b) by 88 days.

(21) Appl. No.: 18/035,061

(22) PCT Filed: Nov. 4, 2020

(86) PCT No.: PCT/CN2020/126590
§ 371 (c)(1),
(2) Date: May 2, 2023

(87) PCT Pub. No.: WO2022/094815
PCT Pub. Date: May 12, 2022

(65) Prior Publication Data
US 2023/0413997 A1    Dec. 28, 2023

(51) Int. Cl.
*F16C 29/04*   (2006.01)
*A47B 88/477*  (2017.01)
(Continued)

(52) U.S. Cl.
CPC .......... *A47B 88/493* (2017.01); *A47B 88/477* (2017.01); *F16C 29/005* (2013.01); *A47B 2210/0032* (2013.01); *A47B 2210/0035* (2013.01); *A47B 2210/0056* (2013.01); *F16C 33/40* (2013.01)

(58) Field of Classification Search
CPC ... A47B 88/493; A47B 88/477; A47B 88/487; A47B 2210/0035; A47B 2210/0056; A47B 2210/0032; F16C 29/005; F16C 29/04; F16C 33/40
See application file for complete search history.

(56) References Cited

U.S. PATENT DOCUMENTS 8,882,351 B2 * 11/2014 Jahrling ................ F24C 15/168
                                                 312/334.45
10,352,361 B2 * 7/2019 Xu .......................... F16C 29/04
(Continued)

FOREIGN PATENT DOCUMENTS

CN    112211905 A  *  1/2021  ............ F16C 29/005

*Primary Examiner* — Kimberley S Wright

(57) ABSTRACT

A ball bearing slide includes: two outer slides, an inner slide located in the outer slides, two ball cages, and ball rows rollably arranged in the ball cages and supported between the inner slide and the outer slides; wherein the inner slide includes two end parts and a connecting part connecting the two end parts; the ball rows are located between the end parts and the outer slides; the outer slides drive the ball rows to rotate in a pull-out direction and a push-in direction; wherein each of the end parts of the inner slide has a free end; the free end of at least one of the end parts projects towards a centerline of the certain ball row to form a stopping part. During operation, the stopping part prevents the ball rows from falling off from the inner slide under excessive force.

8 Claims, 4 Drawing Sheets

(51) Int. Cl.
    *A47B 88/493* (2017.01)
    *F16C 29/00* (2006.01)
    *F16C 33/40* (2006.01)

(56) References Cited

U.S. PATENT DOCUMENTS

2013/0336602 A1* 12/2013 Jahrling ................ F24C 15/168
                                                        384/49
2016/0167098 A1*  6/2016 Weng .................. A47B 88/437
                                                        72/199
2018/0320738 A1* 11/2018 Xu ....................... A47B 88/493

* cited by examiner

BALL BEARING SLIDE

BACKGROUND OF THE PRESENT INVENTION

Field of Invention

The present invention relates to a ball bearing slide, and more particularly to a hidden ball bearing slide that can adapt to a small installation space and prevent ball rows from falling out off the ball bearing slide.

Description of Related Arts

In a conventional ball bearing slide, such as the pulling guide device disclosed in Chinese patent CN103096756B, the inner slide is placed in at least one outer slide and is supported by balls which are arranged in parallel along the length direction. The balls are restricted within the length of the outer slide by ball cages. In a cross section of the outer slide, the balls are positioned at inner corners of the outer slide by the ball cage. Usually, such structure can sufficiently stabilize the balls in a radial direction in the cross-section of the outer slide. Therefore, the conventional ball bearing slides are mostly used in large capacity drawers or pull-out baskets of furniture and household appliances such as refrigerators, ovens, dishwashers, and other furniture to ensure the stability during opening or closing the drawer or basket. However, in practice, when a user applies an excessive force to the furniture or household appliances having such ball bearing slide, the balls can easily fall from the inner slide, which means it is easy to draw the drawer or sliding basket with the balls directly out of the outer slide fixed on the cabinet of the appliance or furniture, making the sliding basket or drawer fall; or push the drawer or sliding basket with the ball into the cabinet of the appliance or furniture fixed with the outer slide, making the sliding basket or drawer jammed.

Therefore, it is really necessary to provide a novel ball bearing slide to overcome the above defects.

SUMMARY OF THE PRESENT INVENTION

An object of the present invention is to provide a ball bearing slide that adapts to a small space for hidden slide installation and prevents ball rows from falling out off the ball bearing slide.

Accordingly, in order to accomplish the above object, the present invention provides a ball bearing slide, comprising: two outer slides, an inner slide located in the outer slides, two ball cages, and ball rows rollably arranged in the ball cages and supported between the inner slide and the outer slides; wherein the inner slide comprises two end parts and a connecting part connecting the two end parts; the ball rows are located between the end parts of the inner slide and the outer slides; the outer slides drive the ball rows to rotate in a pull-out direction and a push-in direction; wherein each of the end parts of the inner slide has a free end, and the free end of at least one of the end parts forms a cocking part extending towards the outer slides; the cocking part has a curved support profile for supporting a certain ball row of the ball rows; an end of the support profile, which faces the pull-out direction or the push-in direction, projects towards a centerline of the certain ball row to form a stopping part, and the stopping part stops the ball rows in the pull-out direction or the push-in direction.

Preferably, a side of the cocking part, which is back to the support profile, forms an angle area with the connecting part of the inner slide, and the angle area is a machining space.

Preferably, the stopping part is formed by stamping the cocking part towards the centerline of the certain ball row.

Preferably, the stopping part is a one-piece structure formed by stamping; a curved bud is formed at an end of the stopping part; and the curved bud is arranged disconnectedly from the cocking part.

Preferably, the stopping part is curved towards the ball rows; a surface of the stopping part, which faces the certain ball row, is curved.

Preferably, the outer slide comprises a bottom wall, as well as a long wall part and a short wall part which are formed by integrally extending both sides of the bottom wall in a vertical direction perpendicular to a width direction; the certain ball row contacts with an interior side of the short wall part; a first side of end parts of the inner slide, which is near the short wall part, is provided with a third curved part against the certain ball row; the cocking part forms a part of the third curved part.

Preferably, the ball rows further comprise a first ball row and a second ball row, wherein the first ball row and the second ball row contact with an interior side of the long wall part, and press against a second side of the end parts opposite to the first side; the certain ball row is a third ball row.

Preferably, the third ball row is located between the first ball row and the second ball row in the vertical direction; the second side of the end parts of the inner slide is provided with a first curved part against the first ball row and a second curved part against the second ball row; the third curved part is located between the first ball row and the second ball row in the vertical direction, and is symmetrically arranged with respect to a symmetry axis of a line connecting centers of the first ball row and the second ball row.

Preferably, the inner slide further comprises a second convex part connecting the second curved part and the third curved part, wherein the second convex part is formed by folding and bending a part between the first curved part and the third curved part and rolling the part at an angle towards the third curved part; one side of the second convex part, which is near the third ball row, forms a part of the third curved part.

Preferably, the outer slide further comprises a curved support part located in the short wall part, wherein the curved support part has a curved internal profile; the curved support part and the third curved part hold the third ball row from both sides in the width direction.

Preferably, an opening is arranged at an end of the third curved pat and an end of the short wall part, and a free end of the ball cages extends out from the opening.

In the ball bearing slide of the present invention, the cocking part is provided at the free end of the end parts of the inner slide, and the stopping part is located on the cocking part to stop the ball rows, so that under an excessive external force, the ball rows will not fall off from the ball bearing slide, effectively ensuring the normal use of the ball bearing slide.

DETAILED DESCRIPTION OF THE PREFERRED EMBODIMENT

Figure 1:
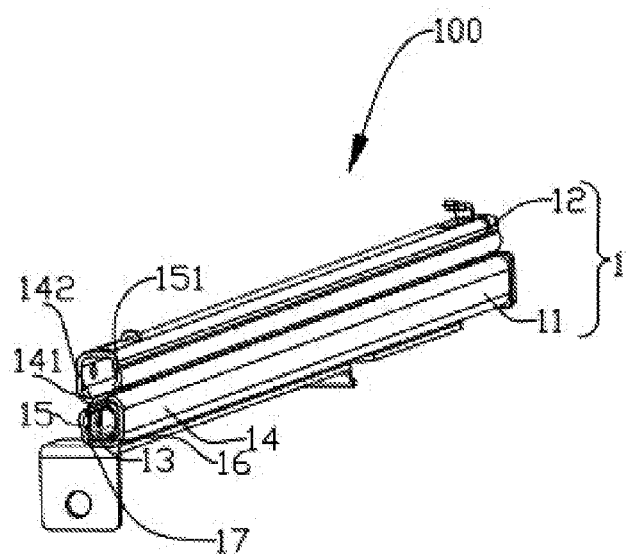
FIG. 1 is a perspective view of a ball bearing slide of the present invention.
Figure 2:
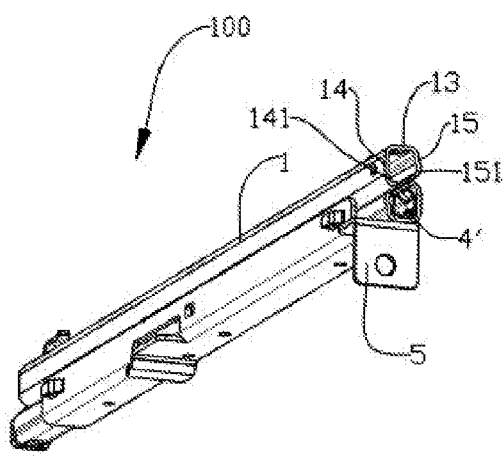
FIG. 2 is viewed from another direction of FIG. 1.
Figure 3:
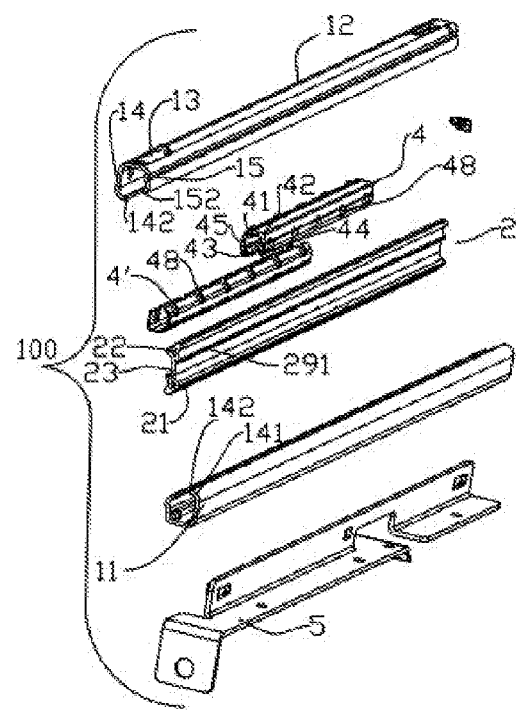
FIG. 3 is an exploded view of the ball bearing slide of the present invention.
Figure 4:
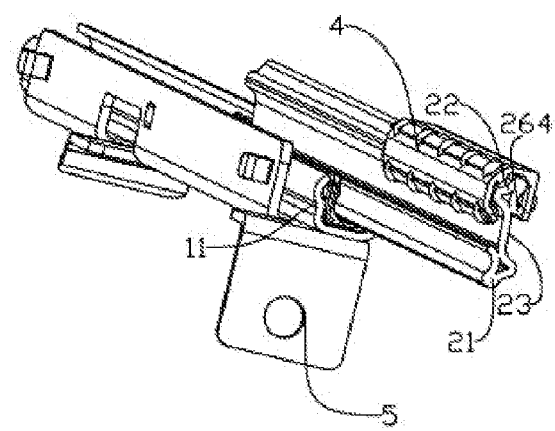
FIG. 4 is perspective view of the ball bearing slide of the present invention after removing a second outer slide at a top.

In the description of the present invention, it should be noted that the terms "upper", "lower", "inner", "outer", etc. indicate orientation or positional relationships that are based on the orientation or positional relationships shown in the accompanying drawings and are intended only to facilitate and simplify the description of the present invention. Such terms are not intended to indicate or imply that the device or component referred to must have a particular orientation or be constructed and operated in a particular orientation. Therefore, such terms cannot be construed as limiting the present invention.

Hereinafter, the ball bearing slide 100 of the present invention will be described in conjunction with FIGS. 1-8.

A ball bearing slide 100 is provided, comprising: two outer slides 1, an inner slide 2 located in the outer slides 1, two ball cages 4 located between the outer slides 1 and the inner slide 2, and ball rows 3 rollably arranged in the ball cages 4 and supported between the inner slide 2 and the outer slides 1.

Figure 5:
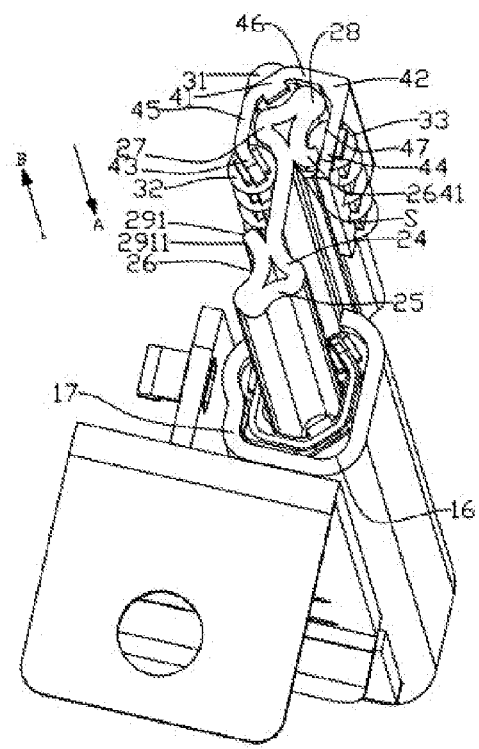
FIG. 5 is a perspective view of the ball bearing slide of the present invention from one lateral end.
Figure 6:
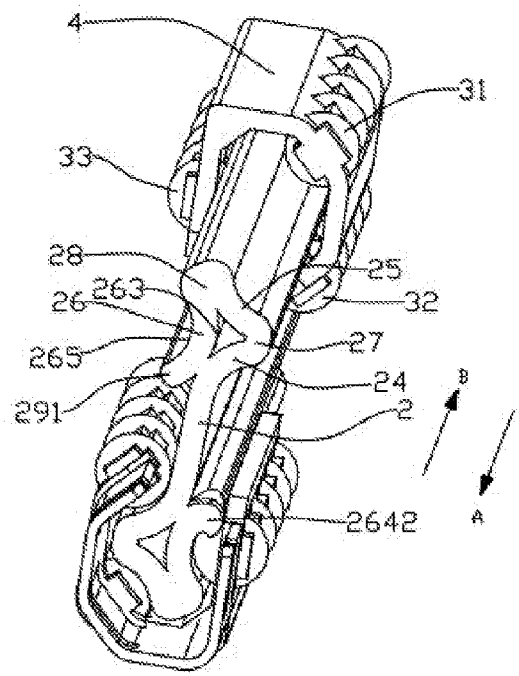
FIG. 6 is a perspective view of the ball bearing slide of FIG. 5 from the other lateral end.
Figure 7:
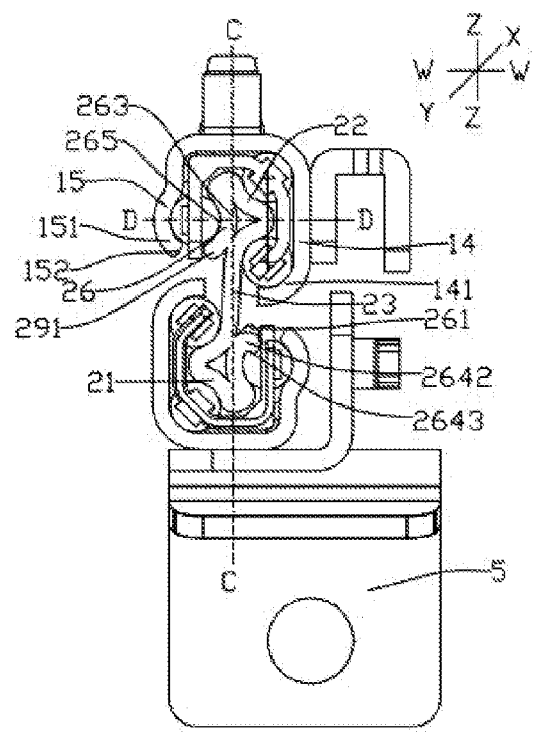
FIG. 7 is a cross-sectional view of the ball bearing slide of FIG. 6.
Figure 8:
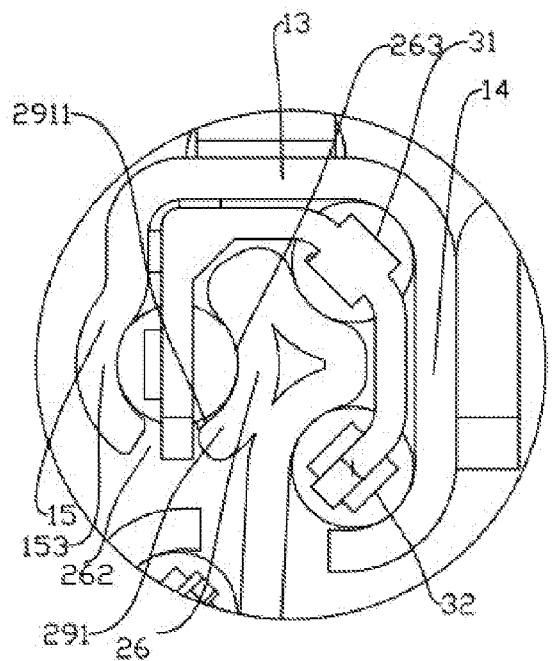
FIG. 8 is a partially enlarged view of FIG. 7.

According to the embodiment, there are two outer slides 1, namely a first outer slide 11 and a second outer slide 12 symmetric to the first outer slide 11. The first outer slide 11 is fixed to a cabinet of furniture or home appliance by a fixing bracket 5, and the second outer slide 12 is fixed to an external wall of a drawer. The outer slides 1 drive the ball rows 3 to rotate in a pull-out direction X-Y (A direction) and a push-in direction Y-X (B direction), as shown in FIGS. 5-7. The pull-out direction X-Y (A direction) or the push-in direction Y-X (B direction) refers to a pull-out direction or a push-in direction of a drawer fixed by the outer slides 1, and likewise the movement directions of the ball rows 3. Referring to FIGS. 1-8, the first outer slide 11 and the second outer slide 12 have the same structure, and the second outer slide 12 will be illustrated as an example. The outer slide 1 comprises a bottom wall 13 fixed with the fixing bracket 5, as well as a long wall part 14 and a short wall part 15 which are formed by integrally extending both sides of the bottom wall 13 in a vertical direction Z-Z perpendicular to a width direction W-W of the bottom wall 13. The outer slide 1 further comprises: a first support 141 formed at an end of the long wall part 14 and having a curved internal contour, a second support 151 formed at an end of the short wall part 15 and having a curved internal contour, a first corner 16 corresponding to the first support 141 and vertically arranged at a top of the long wall part 14, and a second corner 17 corresponding to the second support 151 and vertically arranged at a top of the short wall part 15. The short wall part 15 further comprises a tail part 152 located at an end of the second support part 151, and a curved support part 153 having a curved internal profile and located at a position in the short wall part 15 that corresponds to the ball rows 3.

The inner slide 2 comprises two end parts, namely a first end part 21 corresponding to the first outer slide 11 and a second end part 22 corresponding to the second outer slider 12, and a connecting part 23 connecting the first end part 21 and the second end part 22; the ball rows 3 are located between the end parts of the inner slide 2 and the outer slides. Each of the end parts 21 and 22 of the inner slide 2 has a free end, which means the first end part 21 has the free end, so does the second end part 22. The free end of at least one of the end parts forms a cocking part 291 extending towards the outer slides 1. The cocking part 291 has a curved support profile 2911 for supporting a certain ball row 3 of the ball rows 3. An end (the end along the movement direction of the ball rows 3) of the support profile 2911, which faces the pull-out direction X-Y (A direction) or the push-in direction Y-X (B direction), projects towards a centerline of the certain ball row 3 (a direction of a line connecting centers of balls in a third ball row 33) to form a stopping part 264. The certain ball row 3 is the third ball row 33. The stopping part 264 stops the third ball row 33 in the pull-out direction X-Y (A direction) or the push-in direction Y-X (B direction). According to the embodiment, the stopping part 264 has a first stopping part 2641 at an end of the cocked part 291 of the first end 21 in the pull-out direction X-Y (A direction) and a second stopping part 2642 at an end of the cocked part 291 of the second end 22 in the push-in direction Y-X (B direction), wherein the first stopping part 2641 and the second stopping part 2642 are not provided on the same end, and are symmetrically arranged in the pull-out direction X-Y (A direction) or the push-in direction Y-X (B direction). A side of the cocking part 291, which is back to the support profile 2911, forms an angle area with the connecting part 23 of the inner slide 2, and the angle area is a machining space S. The machining space S is reserved for stamping and forming the stopping part 264. The stopping part 264 is formed by stamping the cocking part 291 towards the centerline of the certain ball row 3. The stopping part 264 is a one-piece structure formed by stamping; a curved bud 2643 is formed at an end of the stopping part 264; and the curved bud 2643 is arranged disconnectedly from the cocking part 291. The stopping part 264 is curved towards the ball rows 3; a surface of the stopping part 264, which faces the certain ball row 3, is curved.

The first side of end parts 21 or 22 of the inner slide 2, which is near the short wall part 15, is provided with a third curved part 26 against the third ball row 33. A second side of the end parts 21 or 22, which is opposite to the first side, is provided with a first curved part 24 against the first ball row 31 and a second curved part 25 against the second ball row 32. The third curved part 26 is located between the first ball row 31 and the second ball row 32 in the vertical direction, and is symmetrically arranged with respect to a symmetry axis D-D of a line connecting centers of the first ball row 31 and the second ball row 32. The cocking part 291 forms a part of the third curved part 26. The inner slide 2 further comprises a second convex part 28 connecting the second curved part 25 and the third curved part 26, and a first convex part 27 connecting the first curved part 24 and the second curved part 25. The first convex part 27 is formed by folding and bending a part between the first curved part 24 and the second curved part 25, and the first convex part 27 is located between the first ball row 31 and the second ball row 32. The first convex part 27 is spaced from the first connecting part 45 in a width direction. One side of the first convex part 27, which faces the first connecting part 45, is a flat part 271, wherein the flat part 271 is rolled into a flat surface to place the ball cage 4. The second convex part 28 is formed by folding and bending a part between the first curved part 24 and the third curved part 26 and rolling the part at an angle towards the third curved part 26. One side of the second convex part 28, which is near the third ball row 33, forms a part of the third curved part 26. The curved support part 153 and the third curved part 26 hold the third ball row 33 from both sides in the width direction W-W. An opening 262 is arranged at an end 261 of the third curved pat 26 and an end of the short wall part 15, and a free end of the ball cages 4 extends out from the opening 262. The connecting wall 23 is tilted to reasonably configure the long wall part 14 and the short wall part 15 of the first outer slide 11 and second outer slide 12 on each side in a staggered form, thus reducing the size of the ball bearing slide 100 in the height direction as much as possible. The first inner slide end 21 and the second inner slide end 22 have the same structure and are arranged in a central symmetry form.

The ball rows 3 are located between the end part of the inner slide 2 and the outer slides 1. According to the embodiment, there are three ball rows 3. In other embodiments, there may be two, three or four ball rows 3. Specifically, the third ball row 33 is the ball row near the free end of the inner slide 2.

The third ball row 33 contacts with the interior side of the short wall part 15. The ball rows 3 further comprise a first ball row 31 and a second ball row 32, wherein the first ball row 31 and the second ball row 32 contact with an interior side of the long wall part 14, and press against a second side of the end parts 21 or 22 opposite to the first side; and a third ball row 33 contacting an interior side of the short wall part 15 and located between the first ball row 31 and the second ball row 32 in the vertical direction. According to the embodiment, there are three ball rows 3. In other embodiments, the number of ball rows is not limited. The technical effect of the embodiment can be achieved as long as the stopping part 264 is arranged at the free end of the inner slide 2 in the pull-out direction or the push-in direction, i.e. in the movement direction, which can stop the ball rows and simplify the formation of the stopping part. It is possible to form the stopping part 264 by stamping at the free end with a thickness of a single material layer of the inner slide. If the free end is not cocked, the free end of the inner slide 2 and the connecting part fit together at the machining space S, and it is impossible to process the thickness of the single material layer.

Referring to FIGS. 1-8, there are two ball cages 4, corresponding to the first outer slide 11 and the second outer slide 12. The ball cage 4 has groove surfaces matching the ball rows, and slots 48 for positioning and holding the ball rows 3 are distributed with intervals on each groove surface. The ball cages 4 are fixed on the inner slide 2. If the ball bearing slide 100 is applied in heat resistant or harsh environments such as microwave oven, the ball cage 4 is made of steel material; and if the ball bearing slide 100 is applied in environments such as drawer furniture, the ball cage 4' is made of plastic material. The ball cage 4 comprises a first holding part 41 for holding the first ball row 31, a second holding part 42 corresponding to the second corner 17, a third holding part 43 for holding the second ball row 32, and a fourth holding part 44 corresponding to the short wall part 15 for holding the third ball row 33, wherein the fourth holding part 44 extends flatly along the vertical direction. The first holding part 41 is arranged corresponding to the first corner 16, the third holding part 43 is arranged corresponding to the first support 141, and the fourth holding part 44 is arranged corresponding to the second support 151. The ball cage 4 further comprises a first connecting part 45 arranged in the vertical direction and connecting the first holding part 41 and the third holding part 43, a second connecting part 46 arranged in a width direction of the ball bearing slide 100 and connecting the first holding part 41 and the second holding part 42, and a third connecting part 47 arranged in the vertical direction and connecting the second holding part 42 and the fourth holding part 44. The first connecting part 45 extends flatly along the vertical direction, and a part of the long wall part 14 corresponding to the first connecting part 45 also extends flatly along the vertical direction. The first connecting part 45, the second connecting part 46 and the third connecting part 47 are provided with corresponding slots 48 for holding the balls 3.

The third curved part 26 has a bottom side 263 and an interior side 265 in the width direction W-W, wherein the interior side 265 is in single point contact with the third ball row 33, and the bottom side 263 exceeds the central axis C-C of the inner slide 2 of the ball bearing slide 100 in the width direction. The inner slide 2 is centrally symmetric, having a central point. A point d is correspondingly placed on the outer slide 1 in the vertical direction. The center point and the point d are located in the same line in the vertical direction Z-Z, and the central axis C-C is a line connecting the two points. The bottom side 263 of the third curved part 26 is pressed towards the first convex part 27 so that the bottom side 263 of the third curved part 26 exceeds the other side of the central axis C-C, thereby compressing the thickness of the ball bearing slide as much as possible and making the long wall part 14 as compact as possible.

The end of the third curved part 26 of the inner slide 2 in a pulling direction of the ball bearing slide 100 is provided with the stopping part 264 for holding and stopping the ball rows 3 and preventing the ball rows 3 from falling out of the inner slide 2. The stop 264 is located at the end of the cocking part 291 of the third curved part 26 in the movement direction of the ball rows 3 in the pull-out direction X-Y (A direction) or the push-in direction Y-X (B direction). The stopping part 264 is curved and cocked towards the third ball row 33, and a radian of the stopping part 264 is smaller than that of the rest of the third curved part 26. In the embodiment, referring to FIG. 7, the second stopping part 2642 is located on the first end part 21 below; also in FIG. 7, the ball rows 3 within the first outer slide 11 below roll from inside to outside of the first end part 21, namely the pull-out direction. Therefore, the second stopping part 2642 is provided on the cocking part 291 exterior to the third curved part 26 of the first end 21 as shown in the drawings. Correspondingly, the first stopping part 2641 is located on the second end part 22 above; also in FIG. 7, the ball rows 3 within the second outer slide 12 above roll from outside to inside of the second end part 22, namely the push-in direction Y-X (B direction). Referring to FIG. 5, the direction in FIG. 5 is reversed from the inside to the outside of FIG. 7, so in FIG. 5, the ball rows 3 above rolls from the inside to the outside of the second end part 22. Therefore, the first stopping part 2641 is provided on the cocking part 291 exterior to the third curved part 26 of the second end pas 22 as shown in FIG. 5. The first stopping part 2642 and the second stopping part 2642 are opposite to each other in the movement direction of the ball rows 3, both being located at the end of the movement direction of the ball rows 3.

According to the present invention, the third ball row 33 is held by the third curved part 26 and the curved support part 153 in the width direction to prevent the third ball row 33 from falling off from the inner slide 2 in the width direction. At the same time, the curved bud 2643 of the stopping part 264 faces the third ball row 33 for supporting the stopping, while the end of the curved support part 151 is also curved towards the third ball row 33 to prevent the third ball row 33 from falling off in the width direction. At the same time, the stopping part 264 is provided at the end of the inner slide 2 in the pull-out direction or the push-in direction (the end in the movement direction of the third ball row) to stop the third ball row 33 from the pull-out direction or the push-in direction, so as to prevent the third ball row 33 from falling out in the pull-out direction or the push-in direction of the inner slide 2. As a result, the third ball row 33 is held in three directions, so as to better hold the third ball row 33 between the inner slide 2 and outer slides 1 and prevent the ball rows from falling off from the inner slide 2 during rolling, which effectively ensures the normal use of the ball bearing slide.

Finally, it should be noted that the above embodiments are used only to illustrate the technical solution of the present invention and not to limit it. Despite the detailed description of the present invention with reference to the foregoing embodiments, it should be understood by those of ordinary skill in the art that it is still possible to modify the technical solution recorded in the foregoing embodiments or to make equivalent substitutions for part or all of the technical features thereof. Such modifications or substitutions do not make the essence of the corresponding technical solution different from those in the embodiments of the present invention.

The above description is only part of all embodiments of the present invention. Any equivalent changes to the technical solution of the present invention made by those skilled in the art after reading the specification are covered by the following claims.

What is claimed is:

1. A ball bearing slide, comprising: two outer slides (1), an inner slide (2) located in the outer slides (1), two ball cages (4), and ball rows (3) rollably arranged in the ball cages (4) and supported between the inner slide and the outer slides; wherein the inner slide (2) comprises two end parts and a connecting part (23) connecting the two end parts; the ball rows (3) are located between the end parts of the inner slide (2) and the outer slides; the outer slides (1) drive the ball rows (3) to rotate in a pull-out direction and a push-in direction; wherein each of the end parts of the inner slide (2) has a free end, and the free end of at least one of the end parts forms a cocking part (291) extending towards the outer slides; the cocking part (291) has a curved support profile (2911) for supporting a certain ball row (3) of the ball rows (3); an end of the support profile (2911), which faces the pull-out direction or the push-in direction, projects towards a centerline of the certain ball row to form a stopping part (264), and the stopping part (264) stops the ball rows (3) in the pull-out direction or the push-in direction;

wherein the outer slide (1) comprises a bottom wall (13), as well as a long wall part (14) and a short wall part (15) which are formed by integrally extending both sides of the bottom wall (13) in a vertical direction perpendicular to a width direction; the certain ball row (3) contacts with an interior side of the short wall part (15); a first side of end parts of the inner slide (2), which is near the short wall part (15), is provided with a third curved part (26) against the certain ball row (3); the cocking part (291) forms a part of the third curved part (26);

wherein an opening (262) is arranged at an end of the third curved part (26) and an end of the short wall part (15), and a free end of the ball cages (4) extends out from the opening (262).

2. The ball bearing slide, as recited in claim 1, wherein a side of the cocking part (291), which is back to the support profile (2911), forms an angle area with the connecting part (23) of the inner slide (2), and the angle area is a machining space(S).

3. The ball bearing slide, as recited in claim 2, wherein the stopping part (264) is formed by stamping the cocking part (291) towards the centerline of the certain ball row.

4. The ball bearing slide, as recited in claim 3, wherein the stopping part (264) is curved towards the ball rows (3); a surface of the stopping part (264), which faces the certain ball row (3), is curved.

5. The ball bearing slide, as recited in claim 1, wherein the ball rows (3) further comprise a first ball row (31) and a second ball row (32), wherein the first ball row (31) and the second ball row (32) contact with an interior side of the long wall part (14), and press against a second side of the end parts opposite to the first side; the certain ball row (3) is a third ball row (33).

6. The ball bearing slide, as recited in claim 5, wherein the third ball row (33) is located between the first ball row (31) and the second ball row (32) in the vertical direction; the second side of the end parts of the inner slide (2) is provided with a first curved part (24) against the first ball row (31) and a second curved part (25) against the second ball row (32); the third curved part (26) is located between the first ball row (31) and the second ball row (32) in the vertical direction, and is symmetrically arranged with respect to a symmetry axis of a line connecting centers of the first ball row (31) and the second ball row (32).

7. The ball bearing slide, as recited in claim 6, wherein the inner slide (2) further comprises a second convex part (28) connecting the second curved part (25) and the third curved part (26), wherein the second convex part (28) is formed by folding and bending a part between the first curved part (24) and the third curved part (26) and rolling the part at an angle towards the third curved part (26); one side of the second convex part (28), which is near the third ball row (33), forms a part of the third curved part (26).

8. The ball bearing slide, as recited in claim 7, wherein the outer slide (1) further comprises a curved support part (153) located in the short wall part (15), wherein the curved support part (153) has a curved internal profile; the curved support part (153) and the third curved part (26) hold the third ball row (33) from both sides in the width direction.

* * * * *